United States Patent
Damm

(10) Patent No.: US 8,595,258 B2
(45) Date of Patent: Nov. 26, 2013

(54) METHOD AND SYSTEM TO MANAGE COMPLEX SYSTEMS KNOWLEDGE

(76) Inventor: Mark Gordon Damm, Vancouver (CA)

(*) Notice: Subject to any disclaimer, the term of this patent is extended or adjusted under 35 U.S.C. 154(b) by 0 days.

(21) Appl. No.: 12/996,575

(22) PCT Filed: May 28, 2010

(86) PCT No.: PCT/CA2010/000818
§ 371 (c)(1),
(2), (4) Date: Feb. 6, 2012

(87) PCT Pub. No.: WO2010/135829
PCT Pub. Date: Dec. 2, 2010

(65) Prior Publication Data
US 2012/0124098 A1    May 17, 2012

Related U.S. Application Data

(60) Provisional application No. 61/182,664, filed on May 29, 2009.

(51) Int. Cl.
*G06F 7/00* (2006.01)
*G06F 17/30* (2006.01)

(52) U.S. Cl.
USPC ........................................ 707/791; 707/794

(58) Field of Classification Search
None
See application file for complete search history.

(56) References Cited

U.S. PATENT DOCUMENTS

| | | | |
|---|---|---|---|
| 6,493,693 B1 | 12/2002 | Hill | 706/46 |
| 6,529,909 B1 | 3/2003 | Bowman-Amuah | 1/1 |
| 6,625,619 B1* | 9/2003 | McClendon et al. | 1/1 |
| 6,671,818 B1* | 12/2003 | Mikurak | 714/4.21 |
| 8,260,587 B2* | 9/2012 | Sanchez et al. | 703/2 |
| 8,396,893 B2 | 3/2013 | Gaffga et al. | 707/792 |
| 2003/0149550 A1* | 8/2003 | Famili et al. | 702/188 |
| 2005/0119767 A1* | 6/2005 | Kiwimagi et al. | 700/19 |
| 2007/0288253 A1* | 12/2007 | Cobb et al. | 705/1 |
| 2008/0195642 A1 | 8/2008 | Voln | 1/1 |
| 2010/0057520 A1* | 3/2010 | Rejai | 705/9 |
| 2011/0066415 A1* | 3/2011 | Thompson et al. | 703/13 |

OTHER PUBLICATIONS

International Search Report and Written Opinion, issued in International Patent Application No. PCT/CA2010/000818, mailed on Jul. 22, 2010.

Smith et al., "Complex system design utilizing a meta-data dictionary," *Proceedings of IEEE International Conference on System, Man and Cybernetics*, 2:1831-1836, 1995.

White et al., "A requirements taxonomy for specifying complex systems," *Proceedings of First IEEE International Conference on Engineering of Complex Computer Systems*, pp. 373-376, 1995.

* cited by examiner

*Primary Examiner* — Hung T Vy
*Assistant Examiner* — Tuan A Pham
(74) *Attorney, Agent, or Firm* — Fulbright & Jaworski LLP

(57) ABSTRACT

Managing complex systems knowledge involves monitoring information generated during operation of a complex system. This information is normalized to a complex system base element that is expressed according to a standardized element taxonomy. During normalization, the information inherits characteristics of the base element. Following normalization, the information is stored in an information database. This information can be used to do any one or more of design, construct, operate, automate and otherwise configure another complex system.

14 Claims, 12 Drawing Sheets

Figure 2a: Element Libraries
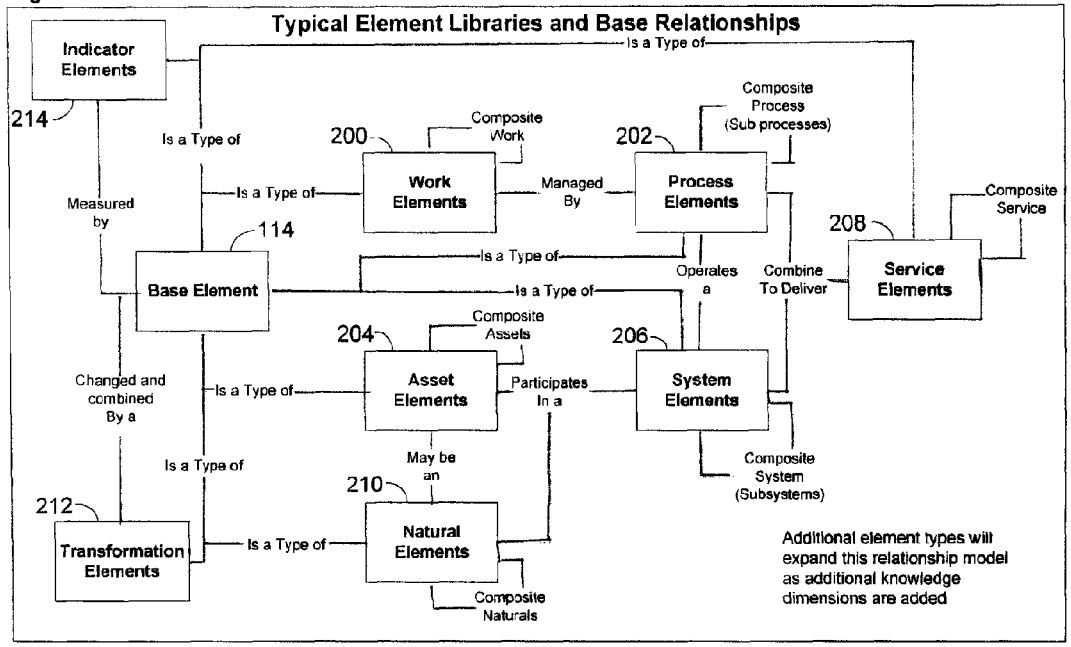
Figure 2b: Automation and Element Template Libraries
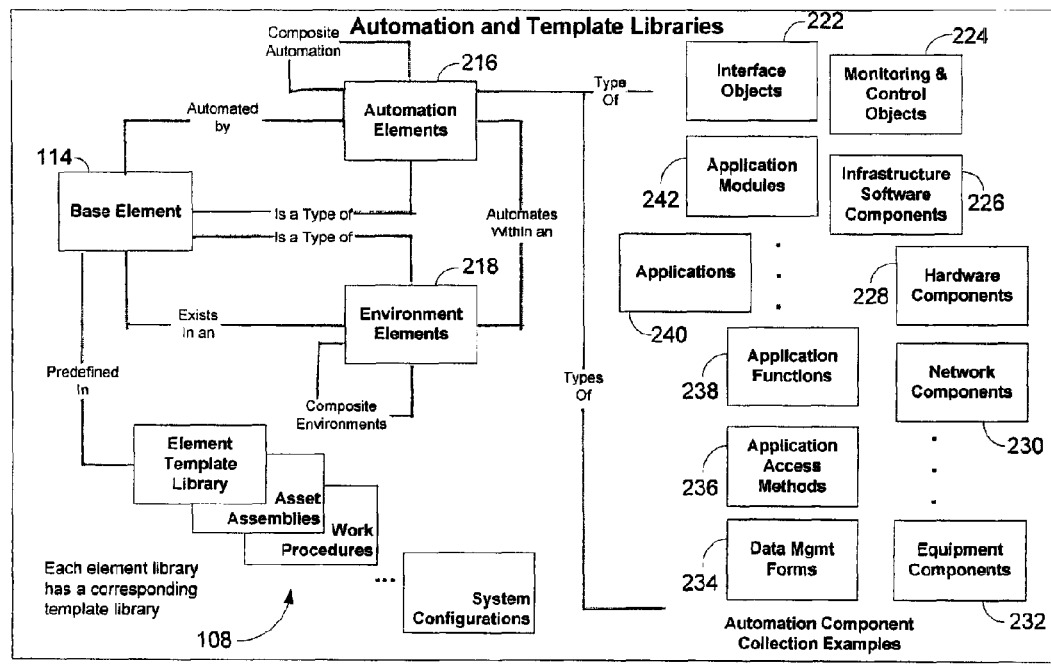

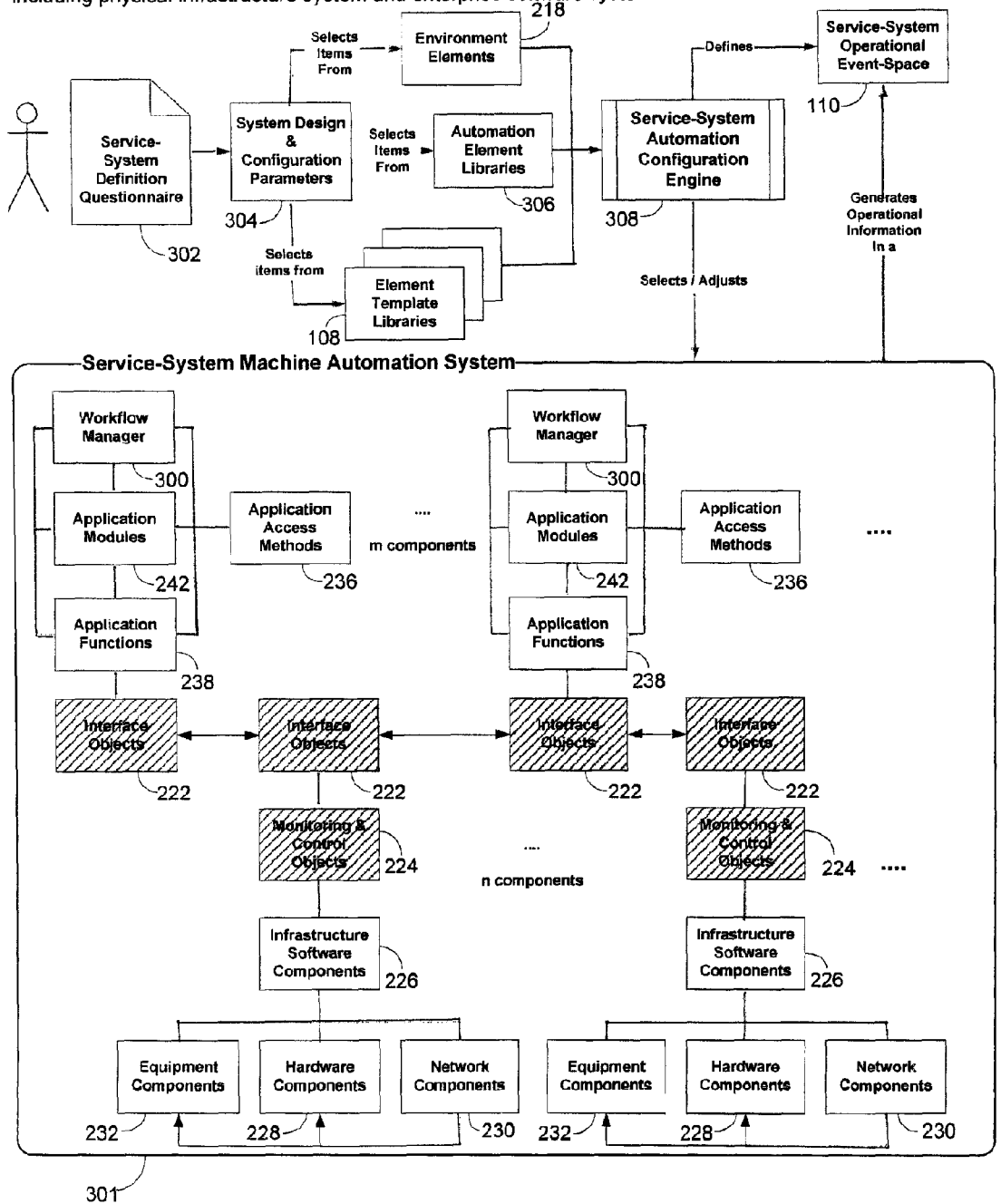
Figure 3: Service-System Automation Process
Automate the design, build, assembly, installation, configuration and operation of complex systems including physical infrastructure system and enterprise software systems

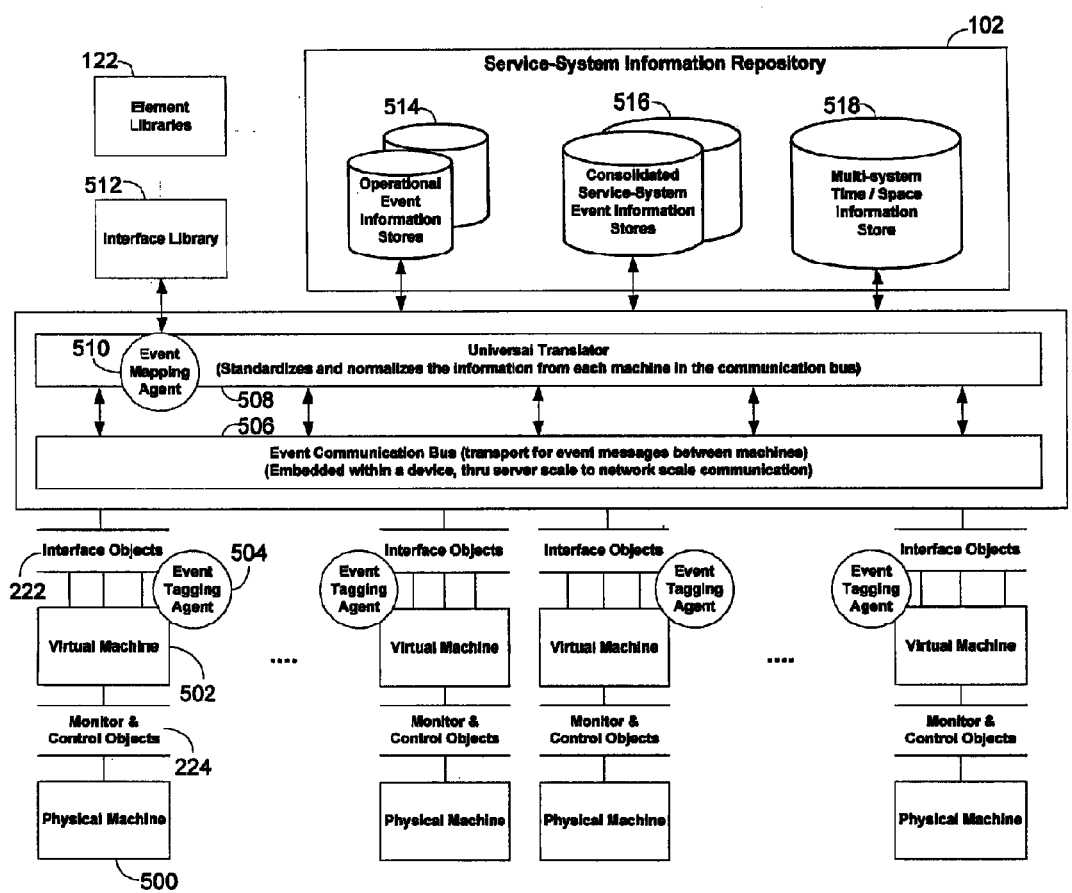

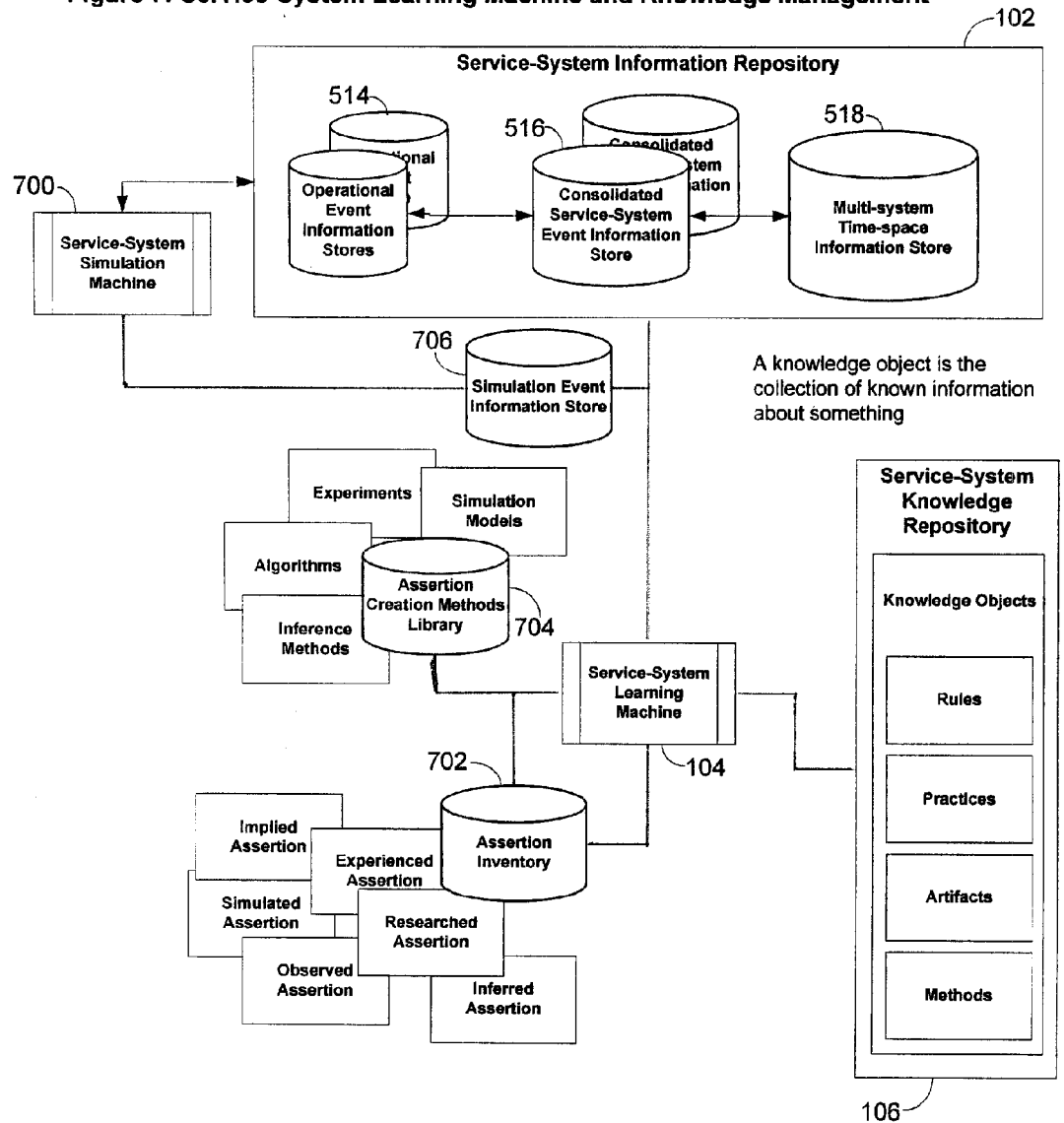

METHOD AND SYSTEM TO MANAGE COMPLEX SYSTEMS KNOWLEDGE

CROSS REFERENCE TO RELATED APPLICATION

This application is a national phase application under 35 U.S.C. §371 of International Application No. PCT/CA2010/000818 filed 28 May 2010, which claims priority to U.S. Provisional Application No. 61/182,664 filed 29 May 2009. The entire text of each of the above-referenced disclosures is specifically incorporated herein by reference without disclaimer.

TECHNICAL FIELD

The present disclosure is directed at a method and system for managing complex systems knowledge. More particularly, the present disclosure is directed at a method and system for generating and recording knowledge in respect of one complex system, and applying the knowledge to design, construct, operate, automate or otherwise configure another complex system.

BACKGROUND

A "complex system" is a system that is composed of many interconnected base elements that affect each others' behaviour. Given the inherent complexity of most complex systems, simply recording information in the form of all the events that occur during operation of a complex system is challenging, and attempting to utilize this information to configure, automate, and improve the performance of the complex system is accordingly more challenging.

Furthermore, different complex systems are traditionally operated independently of each other such that information generated and knowledge learned in respect of one complex system unfortunately cannot practically and easily be applied to operate another complex system.

SUMMARY

According to a first aspect, there is provided a method for operating a complex system. The method includes monitoring information generated during operation of the complex system; normalizing the information to a complex system base element expressed according to an element taxonomy, wherein the information inherits characteristics of the base element during normalization; and storing the normalized information in an information database.

Prior to normalizing the information, the information may be associated with metadata describing the information and the information may be translated such that it is expressed according to the element taxonomy. Associating the information with metadata may include tagging the information with the element taxonomy associated with the base element.

The base element may be drawn from an element library containing information recorded from one or more reference complex systems.

The complex system may be automated by mapping an automation preference to a physical automation item used to automate the complex system, wherein the automation preference is normalized to the base element and inherits automation information from the base element used to operate the physical automation item. The automation information may include automation drawings and an automation bill of materials. The automation information can be used to build an automation system configured to operate the complex system.

Knowledge related to operation of the complex system can be generated by simulating the effect of an assertion on the complex system, wherein the assertion comprises a hypothesis regarding how the complex system operates; and if the assertion is valid, storing the assertion in a knowledge database. The knowledge can be used to increase performance of the complex system when the complex system is automated.

According to another aspect, there is provided a system for operating a complex system. The system includes a monitor object communicatively coupled with a physical machine that comprises part of the complex system, the monitor object configured to monitor information generated by the physical machine during operation of the complex system; an element library comprising a base element expressed according to an element taxonomy; an event mapping agent communicatively coupled between the monitor object and the element library and configured to normalize the information by mapping the information to the base element, wherein the information inherits characteristics of the base element during normalization; and an information database communicatively coupled to the event mapping agent to store the normalized information.

The system may also include a universal translator communicatively coupled between the monitor object and the element library. The universal translator can be used to translate the information such that it is expressed according to the element taxonomy.

The system may also include an event tagging agent communicatively coupled between the universal translator and the physical machine. The event tagging agent can be configured to tag the information with the element taxonomy associated with the base element.

The element library may contain information recorded from one or more reference complex systems.

An automation system may be communicatively coupled to the complex system and configured to map an automation preference to a physical automation item used to automate the complex system, wherein the automation preference is normalized to the base element and inherits automation information from the base element used to operate the physical automation item.

The automation information may include automation drawings and an automation bill of materials. The automation configuration engine can use the automation information to build an automation system configured to operate the complex system.

The system may also include a simulation machine communicatively coupled to the information database and configured to simulate operation of the complex system, wherein the simulation machine is configured to simulate the effect of an assertion on the complex system, wherein the assertion comprises a hypothesis regarding how the complex system operates; a simulation event information store communicatively coupled to the simulation machine and configured to store the simulation events; a knowledge database; and a learning machine communicatively coupled to the information database and to the knowledge database, wherein the learning machine is configured to determine whether assertion is valid by monitoring results of the effect of the assertion and, if the assertion is valid, to store the assertion in the knowledge database.

The system may include an automation configuration engine may be communicatively coupled to the complex system and a knowledge database containing a valid assertion describing how the complex system operates communicatively coupled to the automation configuration engine. The automation configuration engine can modify configuration of the complex system in response to changes in the knowledge database According to a further aspect, there is provided a method for constructing or configuring a complex system. The method includes normalizing a design criterion to a complex system base element expressed according to an element taxonomy to create a normalized design criterion, wherein the design criterion inherits a characteristic of the base element during normalization; mapping the normalized design criterion to a physical item; and constructing or configuring the complex system by incorporating the physical item into the complex system.

The complex system may be an automation system used to automate another complex system.

The element taxonomy may have separate asset and work elements, wherein the asset element describes an asset used to provide a service and the work element describes how the asset is used to provide the service.

The method may also include monitoring information generated during operation of the complex system; normalizing the information to the complex system base element, wherein the information inherits a characteristic of the base element during normalization; and storing the normalized information in an information database.

Prior to normalizing the information, the information may be associated with metadata describing the information, and the information may be translated such that it is expressed according to the element taxonomy. Associating the information with metadata can involve tagging the information with the element taxonomy associated with the base element.

The base element may be drawn from an element library containing information recorded from one or more reference complex systems.

The complex system may be automated by mapping an automation preference to a physical automation item used to automate the complex system, wherein the automation preference is normalized to the base element and inherits automation information from the base element used to operate the physical automation item.

The automation information may include automation drawings and an automation bill of materials, and the automation information can be used to build an automation system configured to operate the complex system.

Knowledge related to operation of the complex system can be generated by simulating the effect of an assertion on the complex system, wherein the assertion comprises a hypothesis regarding how the complex system operates; and if the assertion is valid, storing the assertion in a knowledge database. The knowledge can be utilized to increase performance of the complex system when the complex system is automated.

According to another aspect, there is provided a computer readable medium having encoded thereon statements and instructions for execution by a processor to cause the processor to perform a method according to any of the foregoing methods.

According to another aspect, there is provided a method for configuring software for a complex system having a plurality of elements. The method includes providing application software comprising an operating system, a user interface, and a database; linking the application software with a first set of libraries related to one or more of the plurality of elements of the complex system, to preconfigure the application software; providing a completed questionnaire containing answers to a plurality of questions identifying elements of the complex system; and linking a second set of libraries to the application software based on the answers.

According to another aspect, there is provided a method for managing a complex system. The method includes defining a common language, including an element, for describing a service-system; using the common language to describe an automation; defining the service-system using the common language and a definition questionnaire; generating software to manage information from a physical component, and a hardware component and a network component within the system; storing event information from the components within the system; consolidating the event information in a service-system information repository; and using a service-system learning machine to generate service-system knowledge to manage the complex system.

Beneficially, utilizing the element taxonomy to manage information generated by and otherwise related to the complex system allows knowledge learned in respect of one complex system to be applied to design, construct, automate, operate and otherwise configure another complex system. For example, when knowledge regarding a complex system in the form of a water distribution system is expressed using the element taxonomy and when knowledge regarding another complex system in the form of a water purification system is expressed using the same element taxonomy, the knowledge regarding the water distribution system can be applied without translation to configure the operation of the water purification system. When two different complex systems do not natively use the same taxonomy, knowledge regarding one of the complex systems can be translated and mapped such that it is expressed in terms of the taxonomy of the other of the complex systems, thereby allowing the knowledge to be used to configure the other complex system. Using a taxonomy that distinguishes between work elements and asset elements can be beneficial in that it facilitates decoupling of the knowledge from the context in which the knowledge was generated, thereby making it easier to apply the knowledge to configure another, different complex system.

BRIEF DESCRIPTION OF THE DRAWINGS

In the accompanying drawings, which illustrate one or more exemplary embodiments:

FIGS. 2(*a*)-(*b*) are block diagrams of exemplary element, element template and automation libraries used to categorize information within the first embodiment of the system;

FIG. 3 contains a block diagram and a flowchart of an exemplary method and subsystem, respectively, used within the first embodiment of the system to automate the service-system machine;

FIG. 5 is a block diagram of an exemplary subsystem used within the first embodiment of the system to collect, tag and store information generated during operation of the service-system machine;

FIG. 7 is a block diagram of an exemplary subsystem used within the first embodiment of the system to create and store knowledge related to the service-system machine.

DETAILED DESCRIPTION

Figure 1:
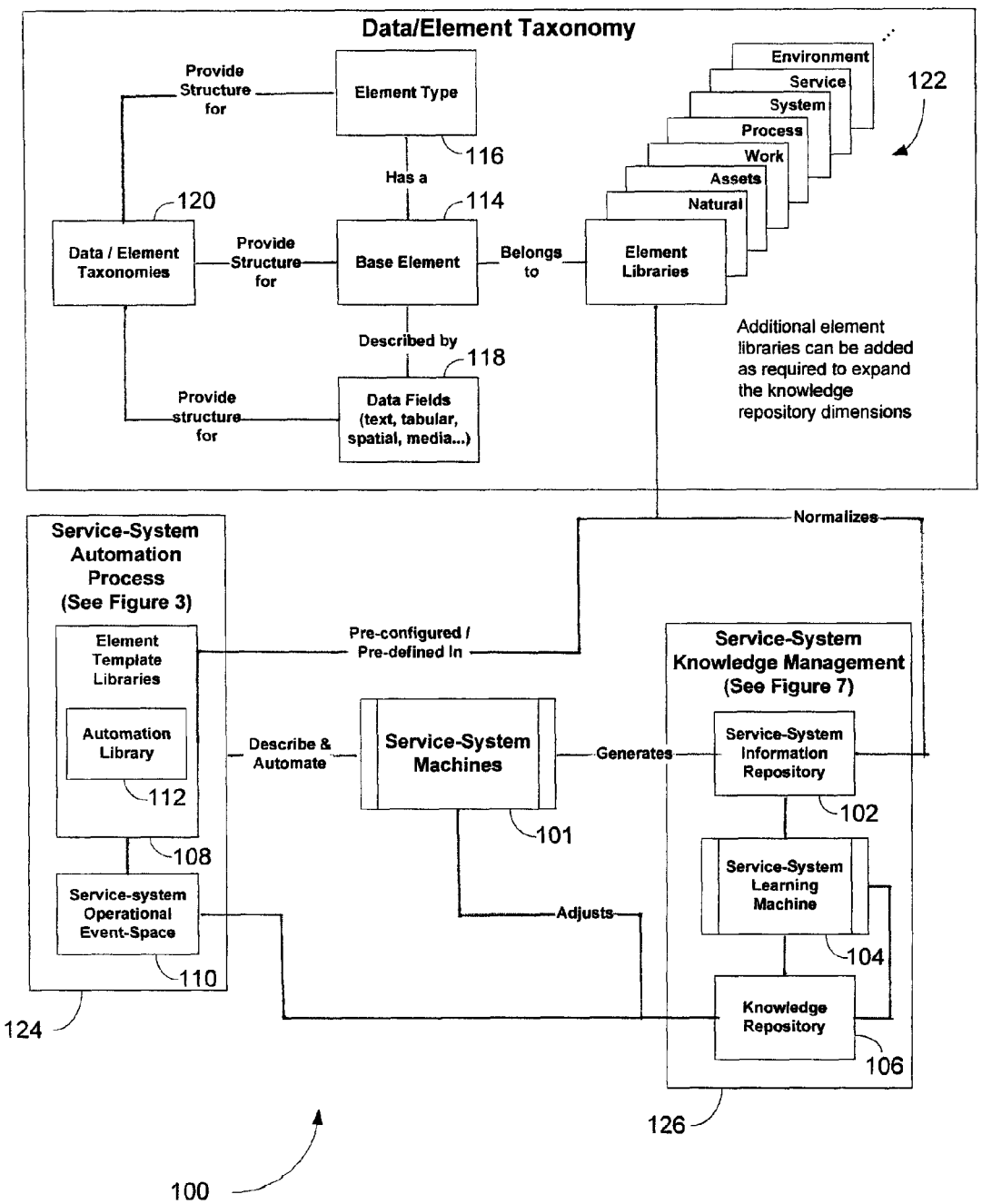
FIG. 1 is a block diagram of a first embodiment of a system for automating and generating knowledge about a service-system machine.

A "complex system" is a system that is composed of many interconnected base elements that affect each others' behaviour. A typical complex system is composed of several hundred base elements whose aggregate activity is non-linear. Due in part to the large number of base elements and to non-linearity, modeling the typical complex system is challenging.

Examples of complex systems include:

- a car manufacturing plant, where examples of base elements include a car frame, robots for moving the car frame during assembly, and workers on an assembly line;
- an emergency dispatch system, where examples of base elements include a phone system for processing an incoming call, an operator who answers the incoming call and dispatches emergency vehicles, and the emergency vehicles themselves;
- an urban transportation network, where examples of base elements include buses and trains that form part of the urban transportation network, a control system that interacts with the buses and trains to schedule them, and riders who use the buses and trains;
- a water distribution system, where examples of base elements include average annual rainfall of the environment in which the water distribution system operates, a piping network through which water is distributed, and pumps for pumping the water through the piping network;
- a natural ecosystem, where examples of base elements include the flora and fauna present in the natural ecosystem, pollution levels in the natural ecosystems, and any human beings who interact with the natural ecosystem; and
- an energy distribution system, where examples of base elements include wires for transmitting electricity, transformers for stepping voltages up and down, and the environment over which the wires are laid.

As emphasized in the above examples, the term "complex system" encompasses a wide variety of different kinds of systems. A complex system can also encompass similar kinds of systems of varying complexity. For example, complex systems can include systems that range from a simple road network to an integrated transportation network incorporating trains, buses, and automobiles; from a household water treatment system to a fully integrated municipal water collection, treatment and distribution system; from a single product manufacturing plant to a globally integrated manufacturing operation; from an in-house energy management system to a fully integrated and intelligent energy grid; from a simple city park to an integrated urban ecosystem; and from single user computer software to a multi-user, enterprise scale computer system. Furthermore, a system used to automate a complex system can itself be a complex system.

Conventionally, knowledge generated during operation of one complex system cannot generally be easily or automatically applied to constructing or improving the operation of another complex system. For example, a first complex system may be a municipal water distribution system that utilizes a pump to pump water, a second complex system may be a household water treatment system that utilizes the same type of pump to pump water, and a third complex system may be a car manufacturing plant that utilizes the same type of pump to pump paint used in car painting. In this example, the second and third complex systems may be able to benefit from knowledge learned from observing and experimenting with the pump in the first complex system. The pump may, for example, be unreliable when operated at a flow rate above a certain threshold, or may be unable to pump fluid when foreign particles exceeding a certain diameter are present in the fluid. However, this knowledge may be not be categorized such that it can be utilized in other complex systems. For example, the first complex system may only record the rate at which water leaves a reservoir, and may not have any way to monitor the performance of the pump in particular. As the second and third complex systems do not use reservoirs, knowledge expressed in teams of a reservoir is inapplicable in these systems. Even if performance of the pump is monitored, the information may be stored in a format that is incompatible with and cannot be used by the second and third complex systems. Furthermore, even if the first complex system can record information related to the flow rate through the pump and the diameter of particulates in the fluid, making inferences as to how this information affects the pump and overall performance of the complex system is difficult.

The embodiments described herein are directed at a method and system that enables knowledge associated with complex systems to be collected and organized such that it can be utilized to construct and to improve the performance of other complex systems. Furthermore, some of the embodiments described herein disclose how information recorded during operation of a complex system can be used to draw conclusions regarding how to improve the performance of the complex system. In the following embodiments, "information" regarding a complex system refers to any type of data generated during operation of the complex system. In contrast, "knowledge" refers to a subset of "information" that describes a proven hypothesis concerning how the complex system operates. For example, when the complex system is a transportation network in which congestion is measured vs. time, "information" includes a graph of the number of cars on the road vs. time, whereas "knowledge" refers to the fact that when traffic lights at a specific intersection malfunction, the number of cars will increase by 10% in a subsequent ten minute period.

Referring now to FIGS. 1, 2(*a*) and 2(*b*), there is depicted a system 100 for managing complex systems knowledge. In the embodiment of FIG. 1, the complex system is an automated system used to provide a specific service, and is therefore identified as a "service-system machine" 101. The service-system machine 101 may be, for example, a car manufacturing plant and the specific service being provided may accordingly be the manufacturing of cars at a certain rate and to a certain quality standard. Various base elements 114 form part of the service-system machine 101; these base elements 114 are grouped into various element types 116 that are structured according to a pre-defined Data/Element Taxonomy 120. By standardizing the Data/Element Taxonomy 120 across different service-system machines 101, knowledge learned in respect of a particular service-system machine 101 can be applied when designing or operating other service-system machines 101.

The system 100 of FIG. 1 is composed of the base elements 114. While the Data/Element Taxonomy 120 used can vary with different embodiments, in the present embodiment the Data/Element Taxonomy 120 is defined such that ten types of the base elements 114 exist: asset elements 204, work elements 200, process elements 202, service elements 208, system elements 206, natural elements 210, indicator elements 214, transformation elements 212, environment elements 218, and automation elements 216. Definitions for and examples of each of the different types of the base elements 114 when the service-system machine 101 is a car manufacturing plant follow:

- The asset elements 204 are tangible or intangible items of value ("assets") that the service-system machine 101 uses to provide the specific service. Examples of the asset elements 204 are human labour, a car body, a conveyor belt on which the car body is placed, robotic arms used to position the car body on the conveyor belt, a paint nozzle for painting the car body, and a pump used to pump paint through the paint nozzle.
- The natural elements 210 are things that occur naturally in nature such as trees, earth, and the weather; the natural elements 210 may also be asset elements 204. Examples of the natural elements 210 are trees and grass. Grass on top of a living roof is an example of one of the natural elements 210 that is also one of the asset elements 204.
- The system elements 206 are collections of the asset elements 204 interconnected such that they can cooperatively work together as part of a larger assembly. An example of one of the system elements 206 is a robotic arm coupled to a paint supply, paint nozzle and control system that is configured to paint a car body.
- The work elements 200 are various activities that the service-system machine 101 performs in order to provide the service. An example of one of the work elements 200 is to paint the car body.
- The process elements 202 are groupings of the work elements 200 that together result in a particular service being provided. An example of one of the process elements 202 is to finish the exterior of the car following assembly, and this process element 202 may include work elements 200 such as sanding the car body, painting the car body, and polishing the car body following painting.
- The service elements 208 result from combining the process elements 202 with the system elements 206 and are specific services provided by or tasks accomplished by the service-system machine 101. An example of one of the service elements 208 is a combination of the process element 202 to finish the exterior of the car following assembly, and the system element 206 composed of the robotic arm coupled to the paint supply, paint nozzle and control system that is configured to paint a car body, in order to provide the service of painting the car body.
- The indicator elements 214 are used to measure characteristics of the base elements 114. An example of the indicator elements 214 is a flow meter placed on a paint flow line to measure the amount of paint being used to paint the car.
- The transformation elements 212 transform one or more of the base elements 114 into different kinds of base elements 114. The transformation elements 212 may be one of the asset elements 204. An example of one of the transformation elements 212 is a catalytic converter, which chemically reduces pollution levels, used within the car.
- The environment elements 218 describe the environment in which the service-system machine 101 operates. The environment elements 218 may also be asset elements 204. An example of one of the environment elements 218 is the amount of annual snowfall that the car manufacturing plant experiences. Average annual snowfall may be important because it can influence the ability for workers, a particular type of asset element 204, to get to work.

The automation elements 216 are types of asset elements 204 and system elements 206 that are used to automate tasks. An example of one of the automation elements 216 is software installed in the control system that automatically controls the robotic arm when it is painting the car. FIG. 2(b) also details various other exemplary automation elements 216, as follows:

- an application 240 is an automated service element 208. When a car body is automatically painted by virtue of software installed on a control system that controls a robotic arm coupled to a paint nozzle and paint supply, the assembly composed of the control system, software, robotic arm, paint nozzle, and paint supply is an example of an application 240.
- an application module 242 is a collection of related applications 240 that work together to provide a service. An example of an application module 242 is a climate control system in a car that interacts with software that controls temperature measurements, heating, and cooling to provide a comfortable driving environment.
- an interface object 222 is an interface used to obtain a reading or measurement related to or to send a command to a piece of hardware; the output of one of the interface objects 222 is an indicator element 214. An example of an interface object 222 is a piece of software that outputs a current flow of paint as measured by a flow meter. In contrast, the indicator element 214 in this example is the measured flow of paint. Interface objects 222 may facilitate communication between any of two pieces of software, software and hardware, and software/hardware and people.
- a monitoring and control object 224 is a piece of software that is used to monitor and control one of the base elements 114. An example of a monitoring and control object 224 is software on a control system that controls the amount of paint flowing to a paint nozzle in response to a message from one of the interface objects 222, and that generates the reading that the flow meter outputs. In an alternative embodiment, instead of using a single monitoring and control object 224, one or both of separate monitoring objects and control objects can be used.
- an infrastructure software component 226 is a piece of software that is used to operate a piece of hardware. Examples of infrastructure software components 226 are an operating system such as Microsoft Windows™ and a device driver installed on a sensor.
- an equipment component 232 is any piece of equipment utilized in automation. For example, when the automation is related to the automatic painting of a car body, examples of the equipment components 228 are the robotic arm used for painting, the paint nozzle, and the computer used in the control system that controls the robotic arm.
- a network component 230 is any piece of hardware used to facilitate communication with or between any elements in the service-system machine 101. The network component 230 may be wired or wireless, and may communicate using standards such as WiFi™ and Ethernet. An example of the network component 230 is a wired connection between a flow meter used to measure the paint level within a paint reservoir and the control system that indicates to a system operator when the paint reservoir is to be refilled.

a hardware component 228 is a computer specific device that is one or both of attached to and integrated with the equipment components 232 and the network components 230. Examples of the hardware components 228 include a computer motherboard and other hardware related to Information and Communication Technology.

a data management form 234 is used to manage data generated or used by persons working with the service-system machine 101 during its operation. An example of the data management form 234 is an interface on an assembly line that allows a worker to enter the amount of time he or she spent working on a particular car, or that allows the worker to view car schematics.

an application access method 236 is a manner in which a user of the applications 240 can access the applications 240. For example, when the application 240 is automated painting of a car body, the application access method 236 may be a control panel that allows an operator to start and stop the robotic arm used for painting.

an application function 238 is a specific software object within an application 240 that performs a particular task. For example, when the application 240 is automated painting of a car body, one of the application functions 238 may be used to properly position the robotic arm used for painting prior to spraying paint, and another of the application functions 238 may be spraying the paint.

Each of the base elements 114 is categorized according to one of the above element types 116 and accordingly placed into one or more element libraries 122. As illustrated in the above examples, a particular item can be classified according to multiple base elements 114. For example, water in a lake may be one of the natural elements 210 and one of the environment elements 218, and may also be one of the asset elements 204 when used to cool machinery in the car manufacturing plant.

In the present embodiment, each of the base elements 114 is described using a one-dimensional text data field 118. In alternative embodiments any one or more of the base elements 114 may be alternatively described, such as by using multi-dimensional tables and arrays, or media in the form of audio or video recordings. In particular, in the present embodiment the Data/Element taxonomy 120 distinguishes between the work elements 200 and asset elements 204. This beneficially facilitates decoupling of the knowledge from the context in which the knowledge was generated, thereby making it easier to apply the knowledge to configure another, different complex system. For example, the asset element 204 may be "mixer" and the work element 200 may be "use the mixer to mix cement for pouring". By keeping these two concepts distinct, other complex systems which have any need for any type of mixer may make use of the knowledge associated with the "mixer", whereas if the asset element and work elements are combined such that the knowledge is expressed in terms of "a mixer for mixing cement", other complex systems that do not utilize cement but nonetheless do utilize mixers may not be able to utilize this knowledge.

Some or all of the base elements 114 in the element libraries 122 are pre-configured in the form of element templates that are stored in element template libraries 108. An element template is a combination of multiple base elements 114 so that a particular task can be performed. For example, a pump (an asset element 204) can be combined with a maintenance procedure (a work element 200) to result in an element template whose task is to maintain the pump. The element template libraries 108 are used in a service-system operational event space 110. The service-system operational event space 110 is a specific instance of the base elements 114 that is used to automate the service-system machine 101, and that is used to collect and normalize information associated with automating the service-system machine 101. By "normalize", it is meant that the information is expressed according to the Data/Element taxonomy 120. For example, the information related to flow rates of a pump may simply be a series of numbers, but when normalized it may be expressed according to metrics including the relevant asset element 204 (a "pump"), and the relevant work element 200 ("pumping water"), in addition to the numerical flow rate. An automation library 112 (interchangeably referred to as an "automation element library") is a collection of the automation elements 216 that are used to automate the element template libraries 108 that form the service-system operational event-space 110. The element template libraries 108, automation library 112, and service-system operational event space 110 reside on an operational server 124 having a processor (not shown) in communication with a computer readable medium (not shown). By coupling the operational server 124 to the service-system machine 101, automation of the operation of part or all of the service-system machine 101 can be achieved. Automating the service-system machine 101 is discussed in more detail in respect of FIG. 3, below.

Operating the service-system machine 101 generates large amounts of operational data. This data is stored in an information database named the service-system information repository 102. The service-system information repository 102 is housed within a learning server 126 on which is instantiated a service-system learning machine 104. As discussed in further detail with respect to FIG. 7, below, the service-system learning machine 104 is capable of determining how to improve performance of the service-system machine 101. Knowledge is stored in a knowledge database named a knowledge repository 106. The service-system learning machine 104 is capable of writing new knowledge to the knowledge repository 106, and of retrieving stored knowledge from the knowledge repository 106. The service-system operational event-space 110 can access the knowledge stored in the knowledge repository 106 when operating the service-system machine 101. By providing the service-system operational event-space 110 with access to the knowledge stored in the knowledge repository 106, a feedback loop is created that allows performance of the service-system machine 101 to be improved.

Referring now to FIG. 3, there is depicted a block diagram of the automation process used to automate the service-system machine 101. A service-system machine automation system 301 is composed of various automation elements 216 used to automate operation of the service-system machine 101; in the present embodiment the service-system machine automation system 301 forms part of the service-system machine 101, although in an alternative embodiment the service-system machine automation system 301 may be separate from the service-system machine 101. When the service-system machine automation system 301 is separate from the service-system machine 101, both systems 101, 301 can nonetheless be complex systems. In the present embodiment, the service-system machine automation system 301 includes n instances of the connected equipment component 232, hardware component 228, and network component 230, each connected to the infrastructure software component 226; in alternative embodiments, more or fewer of these automation elements 216 may be present. Each of these instances represents a specific automation that occurs within the service-system machine 101. For example, one of the n instances may be a robotic arm (equipment component 232) connected to a position sensor (hardware component 232) in the car manufacturing plant responsible for attaching a door to the car body and reporting any errors (via the network component 230) in assembly to a central computer (on which runs the infrastructure software component 226). Connected to each of the n instances is one of the monitoring and control objects 224 that receives input from and outputs readings to one of the interface objects 222. In the car assembly plant, one of the monitoring and control objects 224 may be a piece of software that outputs the position of a stepper motor that controls the position of the robotic arm on the assembly line, and the interface object 222 connected to this monitoring and control object 224 may be a controller used to control operation of the stepper motor. Multiple interface objects 222 may be connected to each other such that different ones of the n instances within the service-system machine 101 may communicate with each other. For example, if each of the n instances represents different positions along the assembly line of the car manufacturing plant, each of the interface objects 222 at different positions along the assembly line may communicate notice of an emergency stoppage to all of the other interface objects 222, thereby effectively shutting down the entire assembly line. Connected to some of the interface objects 222 are one of the application functions 238, application modules 242, and application access methods 236 to allow the operator of the service-system machine 101 to control the service-system machine 101. Workflow managers 300, used to manage progress of the service-system machine 101 as it provides a service, are coupled to the application modules 242. In the car manufacturing plant, the workflow managers allow the status of partially built cars along the assembly line to be tracked.

The automation elements 216 within the service-system machine automation system 301 are selected or adjusted by a controller in the form of a service-system automation configuration engine 308. In order to properly automate the service-system machine 101, the system designer specifies design criteria in the form of system design and configuration parameters 304 that are particular to the service-system machine 101; a subset of the design criteria are automation preferences that are used to automate the service-system machine 101. An example of an automation preference is specifying that a certain rate of production is required; should this rate of production exceed a pre-set threshold, achieving it may require a certain type of equipment to be used. The system designer provides these system design and configuration parameters 304 by answering a questionnaire 302. From the answers to the questionnaire 302, a system manufacturer can select the appropriate automation elements 216 drawn from the automation element libraries 306, element templates drawn from the element template libraries 108, and environment elements 218 for input to the service-system automation configuration engine 308. The service-system automation configuration engine 308 then selects the base elements to be used in or configures the existing base elements in the service-system machine automation system 301, and defines the portion of the service-system operational event-space 110 related to automation. Operation of the service-system machine automation system 301 generates operational information in the service-system operational event-space 110. Generation of the questionnaire 302, creation of the service-system machine 101 and of the service-system automation system 301, and operation of the service-system machine 101 itself are discussed in more detail in respect of FIGS. 4(a)-(d), below.

Figure 4A:
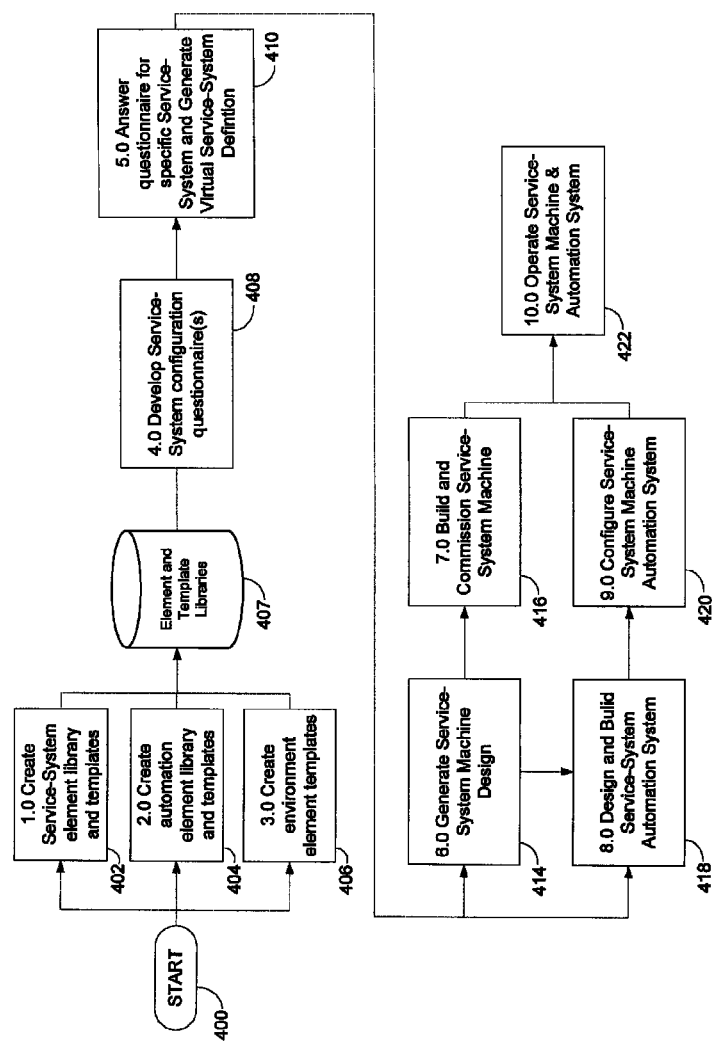
FIGS. 4(*a*)-(*d*) are flowcharts depicting an exemplary method in which the service-system machine can be created, configured, and automated.
Figure 4B:
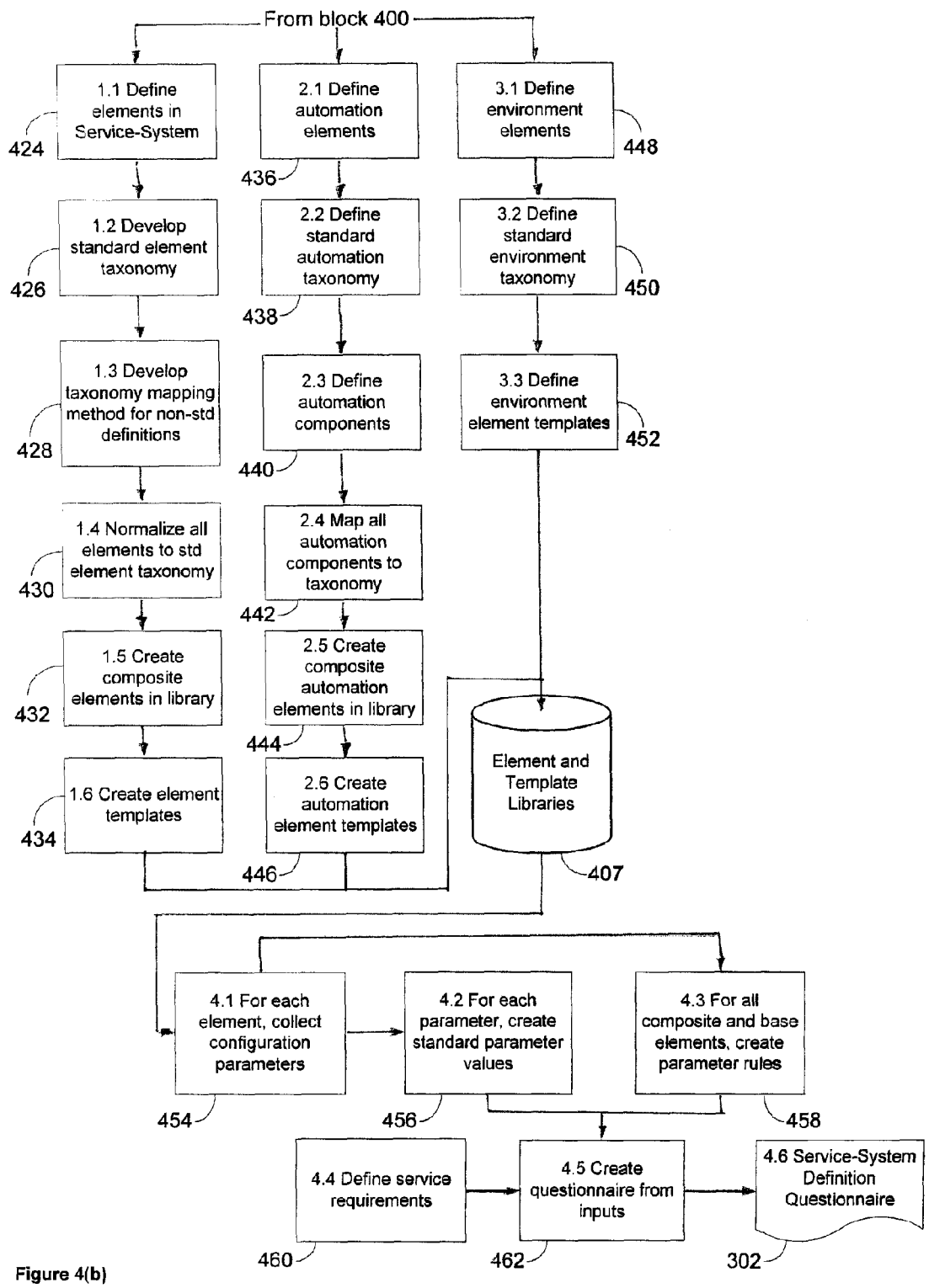
Figure 4C:
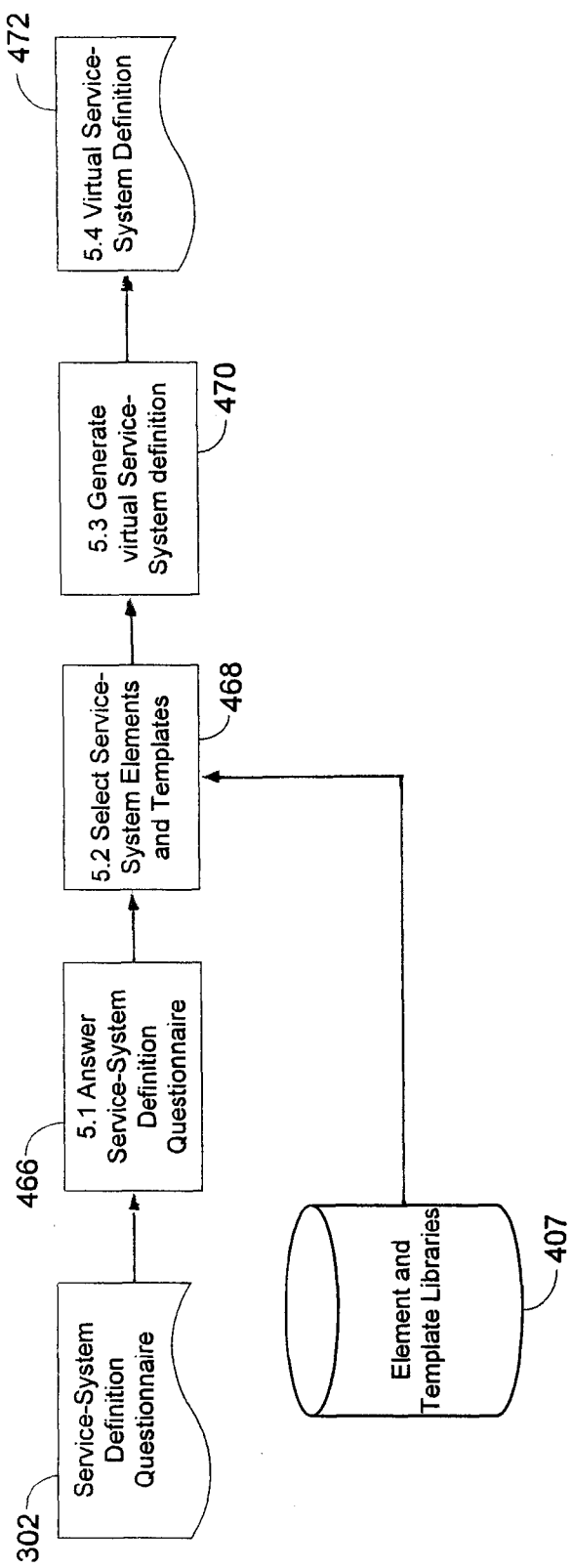
Figure 4D:
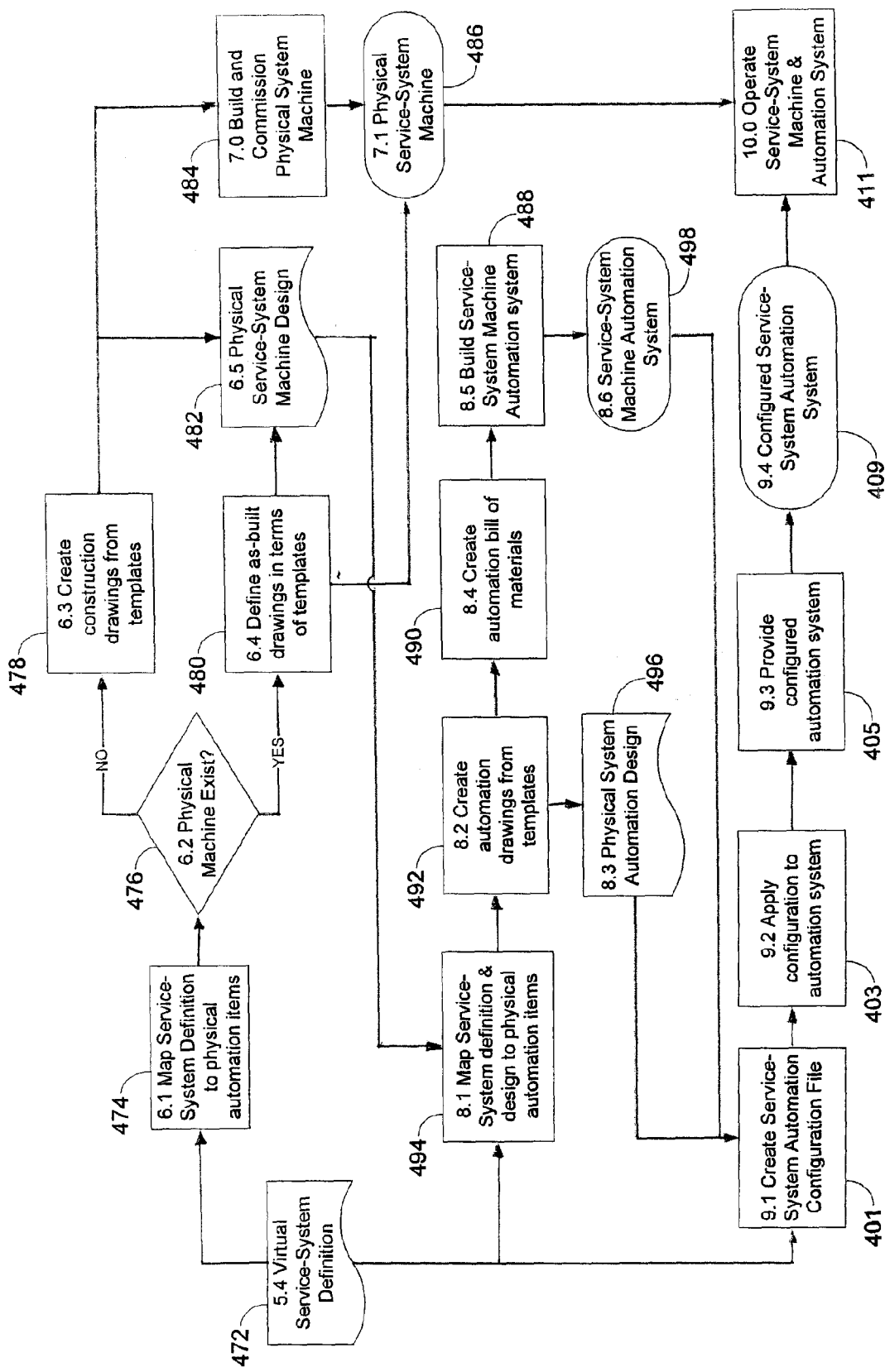

Referring now to FIG. 4(a), there is depicted a flowchart illustrating an embodiment of a method for automating and operating the service-system machine 101. At block 400, the method commences. At blocks 402, 404, and 406, various element and element template libraries are created. Creating the service-system element library and templates in block 402 is detailed in blocks 424 to 434 of FIG. 4(b); creating the automation element library 112 and templates in block 404 is detailed in blocks 436 to 446 of FIG. 4(b); and creating the environment element templates in block 406 is detailed in blocks 448 to 452 of FIG. 4(b).

To create the service-system element library 122, the system designer first defines the elements (block 424) that can be used in the service-system machine 101. Other service-system machines 101 are analyzed to determine which elements will be present in the service-system machine 101. For example, if the service-system machine 101 is the car manufacturing plant, other car manufacturing plants are surveyed to determine what elements they utilize, and the elements to be used in the element libraries 122 for the service-system machine 101 are defined accordingly. If all surveyed car manufacturing plants utilize a conveyor belt to move auto frames, for example, then "conveyor belt" would be one of the elements defined in the element libraries 122 for the service-system machine 101.

The system manufacturer also develops the Data/Element taxonomy 120 (block 426), which is standardized for use with different service-system machines 101, to be used to describe the elements defined in block 424. For example, if a pump to pump paint is defined as an element in block 424, the taxonomy developed for that element in block 426 may be "paint pump". At block 428, the system manufacturer develops a taxonomy mapping method for non-standard element definitions; this accounts for the fact that in some jurisdictions base elements 114 that are in fact identical may be named differently. For example, an electrical "transformer" (a "standard definition") may be called a "turtle" (a "non-standard definition") in certain jurisdictions. By properly mapping non-standard definitions to their standard definitions, service-system machines 101 that are described using base elements 114 named in a non-standard manner can be automated; this is discussed in more detail with respect of FIG. 7, below. At block 430, the system designer normalizes the elements in the service-system machine 101 to the standard taxonomy 120 developed in block 426; this ensures that all the base elements 114 used in the service-system machine 101 are expressed in terms of the standard element taxonomy 120. At block 432, any composite elements that can be used in the service-system machine 101 are created; for example, a "paint gun" composed of a paint pump, paint nozzle, and paint reservoir can be created. At block 434, element templates that can be used in the service-system machine 101 are created; for example, a "painting station" may be constructed from a robotic arm, paint gun, and related control system. All elements and element templates for the service-system machine 101 are then stored in an element and template library database 407.

To create the automation elements 216, the system manufacturer first defines that various automation elements 216 (block 436) that can be used within the service-system machine 101. The system manufacturer also develops a standard automation taxonomy (block 438) to be used to describe the automation elements 216 defined in block 436. For example, the automation taxonomy used to identify the automation element 216 responsible for painting the car may be "control system software for automatically painting the car body". At block 440, the system manufacturer defines automation components. Following defining the automation components, the system designer maps the automation components to the automation taxonomy defined in block 438. In block 444, composite automation elements are created, and automation element templates are created in block 446. All automation elements and automation element templates for the service-system machine 101 are then stored in the element and template library database 407.

To create the environment elements, the system manufacturer first defines the various environment elements 218 (block 448) that can be used within the service-system machine 101. The system manufacturer also develops a standard environment taxonomy (block 450), and defines environment element templates (block 452). The environment elements and environment element templates are then stored in the element and template library database 407.

After blocks 402, 404, and 406 are complete, the element and template library database 407 is sufficiently populated to allow the system designer to develop the questionnaire 302; this is done in block 408. The method of block 408 is detailed in blocks 454 to 462 of FIG. 4(b).

In block 454, the system manufacturer first collects configuration parameters; configuration parameters are used to particularize the automation elements 216. For example, when the automation element 216 is a server attached to a network, one of the configuration parameters is the IP address of the server. For each of the configuration parameters, the system designer then creates standard parameter values (block 456); a standard parameter value is a default value for the configuration parameter. For example, when the configuration parameter is an IP address, the standard parameter value may be the range of IP addresses from 192.168.0.0 to 192.168.0.100. Alternatively, for all composite and base elements, the system manufacturer then creates parameter rules (block 458); the parameter rules are a version of the configuration parameters that are imbued with logic. For example, when the base element 114 is a pump, the configuration parameter may be to tune a sensor in the pump to a particular setting, whereas the parameter rule may be to tune the pump to a particular setting when the pump is placed in an environment of a first temperature, and to tune the pump to a different setting when the pump is placed in an environment of a second temperature. Prior to generating the questionnaire 302, the system manufacturer also defines service requirements of the service-system machine 101 (block 460); service requirements include the quality to which cars are to be manufactured and the rate of manufacture. From the parameter rules, parameter values, and service requirements, the questionnaire 302 is created (block 462). In the context of the car manufacturing plant, exemplary questions in the questionnaire are "What models of cars are being created?", "What is the base level of quality that is required?", and "What is the budget for the plant?"

Following creation of the questionnaire 302, the system designer answers the questionnaire 302 (block 410) in order to enable creation and automation of the service-system machine 101. As mentioned above, the answers to the questionnaire constitute the design criteria and automation preferences. The method of block 410 is detailed in blocks 466 to 472 of FIG. 4(c). In block 466, the system operator answers the questionnaire 302. From the system designer's answers to the questionnaire 302, the system manufacturer selects appropriate elements and element templates from the element and template library database 407 (block 468), and generates a virtual service-system definition 472 (block 470). The virtual service-system definition 472 is a computer generated version of the service-system machine 101, based on and including a complete bill of materials used for the service-system machine 101 itself.

Following completion of block 410, the service-system machine 101 is designed and built at blocks 414 and 416, respectively, the service-system automation configuration engine 308 is generated at block 418 and the service-system machine automation system 301 is configured at block 420, prior to operating the service-system machine 101 and the service-system machine automation system 301 at block 422. In the present embodiment, an example of the service-system machine 101 is the car manufacturing plant and all equipment and procedures for operating the plant to build cars; an example of the service-system automation system 301 is the automation technology used to operate, monitor and control the plant, including all software, hardware and other systems such as financial software, scheduling systems, and device control systems; and an example of the virtual service-system definition 472 is a virtual representation of the car manufacturing plant. Particulars of the method of block 414 are depicted in blocks 474 to 482 of FIG. 4(d); particulars of the method of block 416 are depicted in blocks 484 to 486 of FIG. 4(d); particular of the method of blocks 418 are depicted in blocks 488 to 498 of FIG. 4(d); and particulars of the method of block 420 are depicted in blocks 401 to 409 of FIG. 4(d).

In order to generate the service-system machine 101 design, the service-system definition is first mapped to physical items (block 474); by "service-system definition", it is meant the responses the system designer has provided by answering the questionnaire 302. If the service-system machine 101 does not exist, then the system manufacturer can create construction drawings for the service-system machine 101 from the element templates in the element template libraries 108 (blocks 476 and 478). Following creation of the construction drawings, the service-system machine 101 can be built (blocks 484 and 486) and operated (block 411).

If the service-system machine 101 does exist, then the design drawings depicting the service-system machine 101 are defined in terms of the element templates in the element template libraries 108 (blocks 476 and 480). Following this, the service-system machine 101 is operated (block 411). Defining the service-system machine 101 in terms of the templates ensures that the information generated during operation of the service-system machine 101 is expressed in terms of the Data/Element Taxonomy 120.

In order to automate the service-system machine 101, the service-system definitions (the base elements 114 that correspond to the design of the service-system machine design 101) are mapped to physical automation items (block 494); for example, if one of the service-system definitions is a pump having certain characteristics, this pump is mapped to a particular, tangible make and model of pump to be used in the service-system machine 101. Automation drawings (analogous to blueprints or schematics for the service-system machine automation system 301) are then created from the element templates (block 492). A physical system automation design 496 results from creating the automation drawings. A bill of materials is created following creation of the automation drawings (block 490), and from the bill of materials and automation drawings the service-system machine automation system 301 is built (blocks 488, 498). Using the physical system automation design 496, a service-system automation configuration file is created (block 401), and the configuration file is applied to the service-system machine automation system 301 (block 403). The service-system automation configuration file contains the values of the configuration parameters and parameter rules. A configured service-system machine automation system 301 results (blocks 405, 409). The service-system machine automation system 301 is used to automate the service-system machine 101 (block 411).

Referring now to FIG. 5, there is depicted a block diagram of the system used to store data generated during operation of the service-system machine 101 in the service-system information repository. The service-system information repository 102 includes three different databases: an operational event information store 514, a consolidated service-system event information store 516, and a multi-system time space information store 518. The operational event information store 514 records a history of the operational events involving the base elements 114 that occur during operation of the service-system machine 101. The consolidated service-system event information store 516 includes the service-system information repository 102, and also of other, similar service-system machines 101. For example, if the operational event information store 514 records the event history of the car assembly plant, then the consolidated service-system event information store 516 records the event history of other car assembly plants at different sites. The multi-system time space information store 518 records the event history of different kinds of service-system machines 101. For example, if the operational event information store 514 and the consolidated service-system event information store 516 record the event histories of car assembly plants, the multi-system time space information store 518 records the event histories of different types of service-system machines 101 that may nevertheless generate data relevant for use in the service-system machine 101 in question. For example, when the service-system machine 101 in question is the car assembly plant, the multi-system time space information store 518 may contain event history generated by a water distribution plant on the basis that pumps used to pump water in the water distribution plant may be relevant for use in the car assembly plant to pump paint.

During operation of the service-system machine 101, the monitor and control objects 224 are coupled to a physical machine 500, which is any part of the service-system machine 101 that is capable of performing a work element 200. Examples of the physical machine 500 include a back-hoe, a computer server, or in the context of the car assembly plant, a conveyor belt. The monitor and control object 224 records time sequenced events describing operation of the physical machine 500. Examples of such events include the rate of motion of a conveyor belt in the car manufacturing plant and the temperature of an oven in a bakery. The monitor and control object 224 transfers recorded events to a virtual machine 502. The virtual machine 502 captures and correlates the information from the physical machines 500 and performs the work elements 200 on them.

Coupled to the virtual machine 502 is an event tagging agent 504. The event tagging agent 504 tags raw data generated by the physical machine 500 with information to allow it to be mapped to the Data/Element Taxonomy 120; this facilitates categorization and storage of the event history in the service-system information repository 102. The tagged information is sent via an event communication bus 506 to a universal translator 508, which transforms the tagged information into the same taxonomy used by the base elements 114 stored in the element libraries 122. An event mapping agent 510 then relates the tagged information to the corresponding base elements 114 stored in the element libraries 122, and inherits all information related to the tagged information from the element libraries 122. In this way, the event mapping agent 510 leverages the information stored in the element libraries 122 to provide context and to enhance the raw information obtained from the physical machine 500. Following mapping, the information from the physical machine 500 is stored in the service-system information repository 102.

Figure 6A:
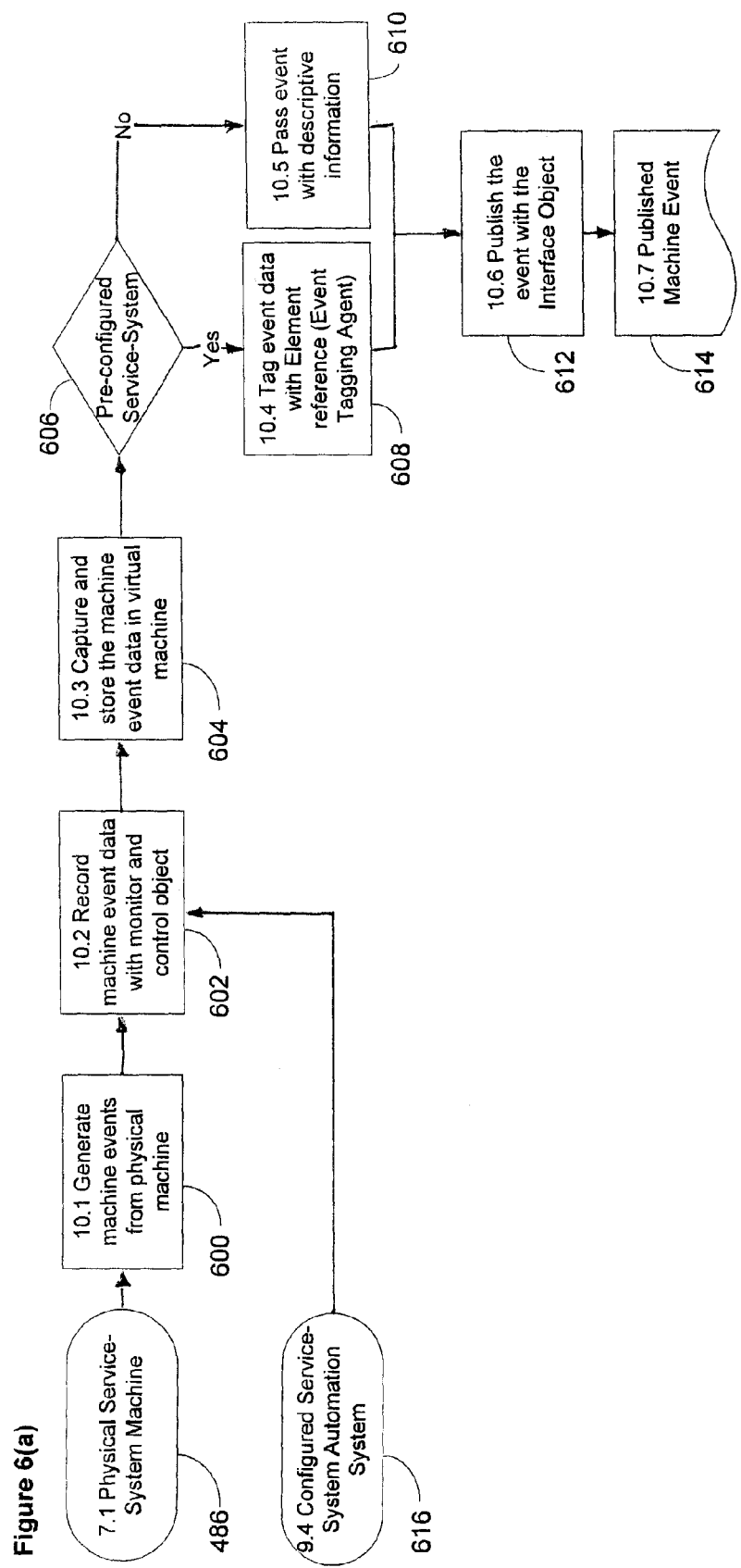
FIGS. 6(*a*)-(*b*) are flowcharts depicting an exemplary method in which information that the service-system machine generates can be collected, tagged and stored.
Figure 6B:
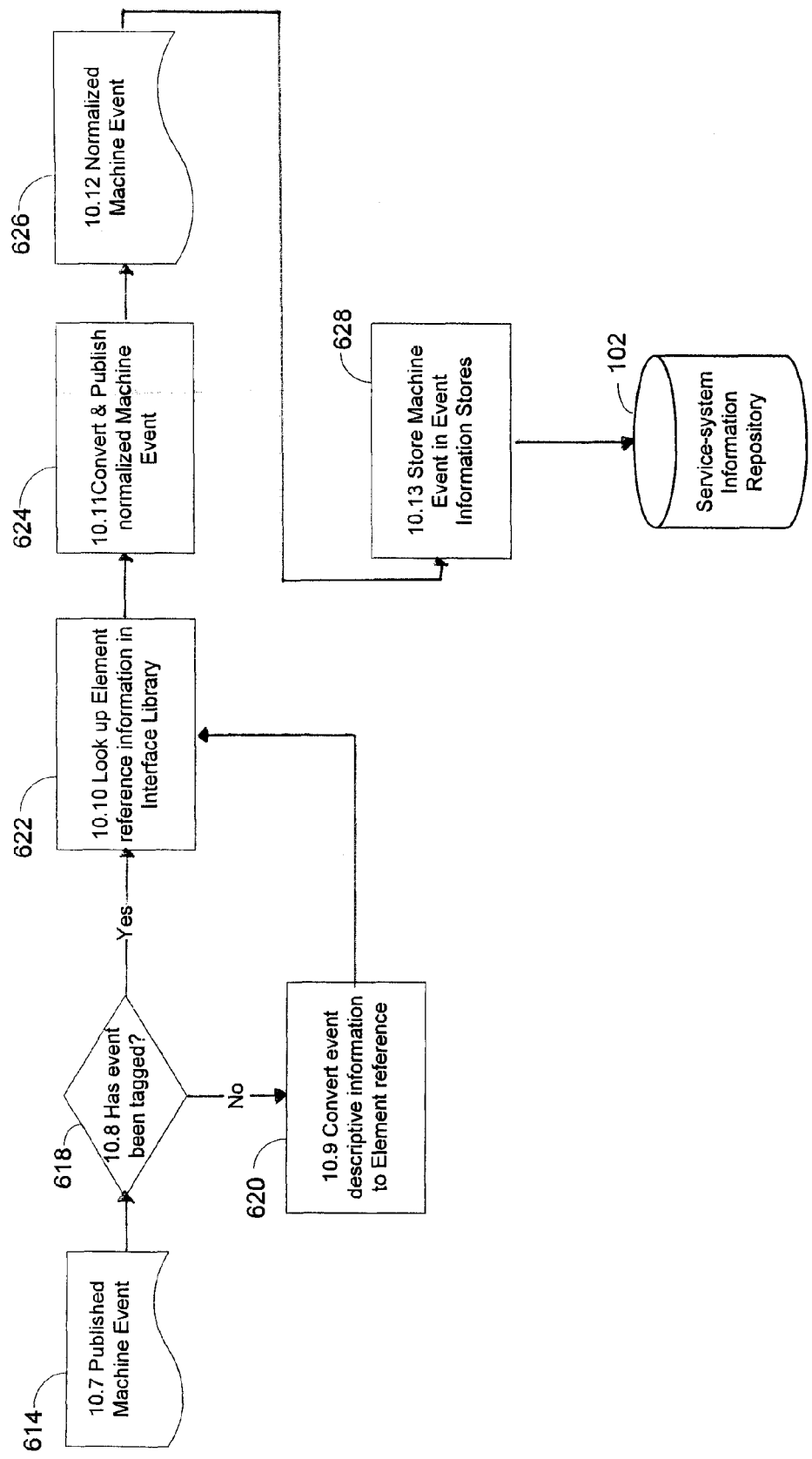

Referring now to FIGS. 6(*a*) and 6(*b*), there is depicted an embodiment of a method for obtaining information from the physical machine 500 and for storing this information in the service-system information repository 102; the service-system machine automation system 301 executes this method. While the service-system machine 101 is operating, the various base elements 114 generate information in the form of machine events (blocks 486 and 600). The monitor and control object 224 records this information (block 602), and transmits it to the virtual machine 502 where it is stored (block 604). If the service-system machine 101 is pre-configured (expressed in terms of base elements 114 expressed in the element libraries 120) (block 606), then the event tagging agent 504 tags the information (block 608) with an element reference from the Data/Element Taxonomy 120, and the interface object 222 publishes, or transfers, the tagged information to the event communication bus 506. If the service-system machine 101 is not pre-configured (block 606), the information is passed with descriptive information of some sort (e.g.: a brief description of the nature in which the information was obtained) (block 610), following which the tagged information is again published to the event communication bus 506 (blocks 612 and 614). Both the descriptive information applied at block 610 and the element reference applied at block 608 are types of metadata. At block 618, it is determined whether the information has been tagged at block 608. If the information has been tagged, the event mapping agent 510 looks up the tagged element reference in the interface library 512 (block 622), and inherits attributes associated with the element reference and applies them to the information (block 624). The result of this inheritance is a normalized machine event (block 626), which is then published and stored in the service-system information repository 102 (block 628). Even if the information has not been tagged, the information is converted to an element reference prior to looking up the element reference at block 622.

Referring now to FIG. 7, there is depicted a block diagram of various components used to enable the service-system learning machine 104 to generate knowledge regarding what affects the operation, functionality and efficiency of the service-system machine 101. As discussed above in respect of FIG. 1, the service-system learning machine 104 is coupled to the service-system knowledge repository 106. The knowledge repository 106 contains various knowledge objects describing as aspect of the operation of the service-system machine 101; the knowledge objects in the present embodiment are categorized into rules, practices, artifacts, and methods. An example of a knowledge object is the understanding that in a car assembly plant, using 10 workers on a particular assembly line is more efficient than using 40 workers on the particular assembly line; this knowledge object would constitute a "practice". In order to generate the knowledge objects, the service-system learning machine 104 sends assertions to a simulation event information store 706 for use by the service-system simulation machine 700. Assertions are hypotheses regarding how the service-system machine 101 operates. If the assertions are verified as being accurate, they are stored in the service-system knowledge repository as a knowledge object. Assertions can either be pre-defined in an assertion inventory database 702, or can be created by the service-system learning machine 104 using methods stored in an assertion creation methods library 704. An example of an assertion creation method is randomly changing various work elements 200 in order to observe changes in the operation of the service-system machine 101 and to attempt to draw conclusions from changes in the operation of the service-system machine 101 relative to the changing work elements 200. A service-system simulation machine 700 accesses the assertions stored in the simulation event information store 706 and simulates how the service-system machine 101 operates if it were to apply a particular assertion; the service-system simulation machine can be a processor running a piece of simulation software, such as Matlab™ or Wolfram Mathematica™. The results of the simulation are stored in the service-system information repository 102. The service-system learning machine 104 accesses the results of the simulation from the service-system information repository 102, and if the results of the simulation are in accordance with the theoretical result prior to running the simulation, the assertion constitutes "knowledge" that is stored in the service-system knowledge repository 106.

Figure 8:
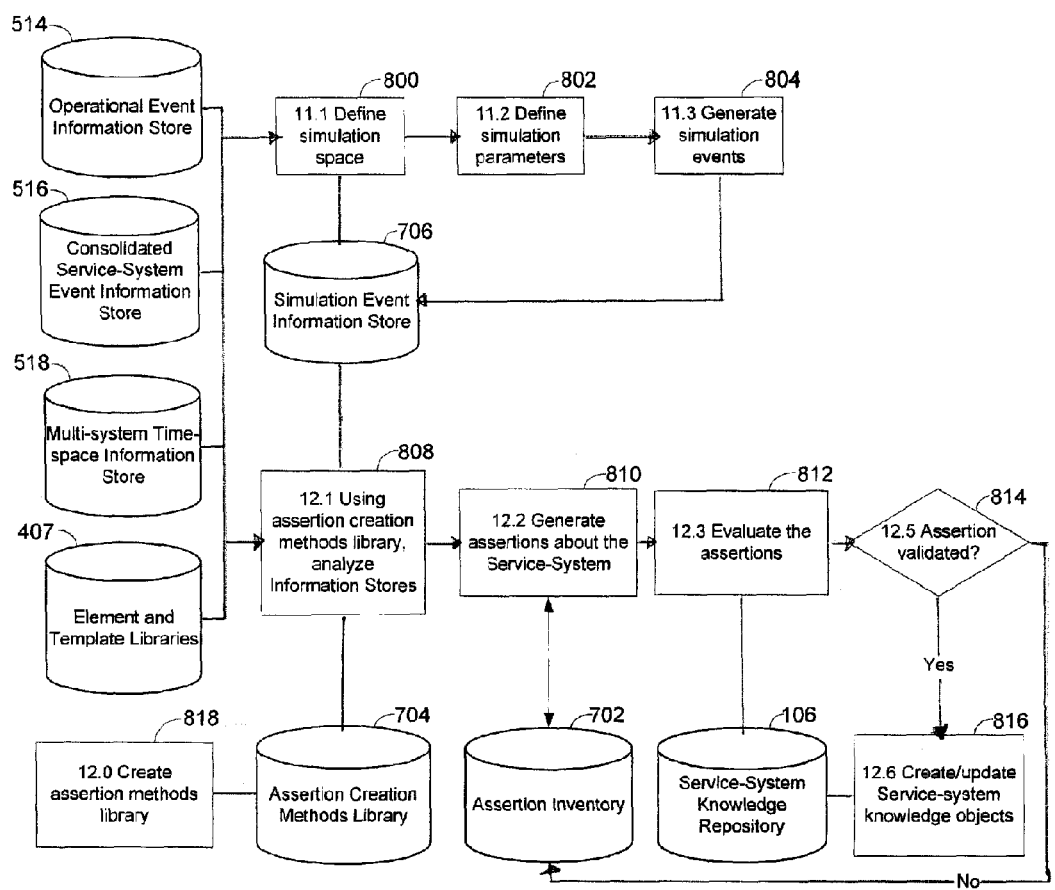
FIG. 8 is a flowchart of an exemplary method for generating and storing knowledge related to the service-system machine.

Referring now to FIG. 8, there is depicted an embodiment of a method for generating knowledge for storage in the service-system knowledge repository 106. In the embodiment of FIG. 8, the assertions are created using the assertion creation methods library 704, which is created at block 818 by, for example, defining different rules for validating an assertion. At blocks 808 and 810, the service-system learning machine 104 generates the assertions about the service-system machine 101; the assertions are stored in the assertion inventory 702. The assertions are evaluated at block 812 through simulation using the service-system simulation machine 700. If the assertion is established as being valid, the service-system knowledge repository 106 is updated (block 816); otherwise, the assertion does not become part of the service-system knowledge repository 106. The service-system simulation machine 700 simulates the affect of the assertion on the service-system machine 101 by defining a simulation space (block 800), defining simulation parameters (block 802) simulation space is duplicate of the Service-System Operational Event Space 110 that has no data in it—a virtual model of the car manufacturing plant with all connected systems—the simulation parameters are the equivalent to the Environment Elements defined to configure the system—but we expand the simulation to compare our results to including other systems to validate across a broader section of systems, and accordingly generating simulation events 804 during the course of simulation. The simulation space is a virtual model of the various base elements 114 in the service-system machine 101 akin to the service-system operational event space 110. The simulation parameters are analogous to the environment elements 218 for the service-system machine 101, i.e., they describe the environment in which the simulation is performed. The simulation events are stored in the simulation event information store (block 706). As depicted in FIG. 7, the service-system simulation machine 700, which implements blocks 800 to 804, and the service-system learning machine 104, which implements blocks 808 to 816, have access to the element and template libraries database 407 and to the databases 514, 516, 518 that form the service-system information repository 102.

Applications of the system according to the foregoing embodiments include managing application software systems, such as building a generic software configuration engine, and leveraging libraries of software components to build generic application configurations for specific software applications for complex systems. The system, according to the foregoing embodiments, can also be used to manage a complex infrastructure system, build a generic infrastructure design tool, or design new types of infrastructure systems leveraging current knowledge.

The system and method according to the foregoing embodiments can be useful for consultants, systems integrators, software companies and engineering groups when preparing or modifying software installations, designing and building complex systems and operating complex systems.

As will be apparent to those skilled in the art, the various embodiments described above can be combined to provide further embodiments. Aspects of the present systems, methods and components can be modified, if necessary, to employ systems, methods, components and concepts to provide yet further embodiments. For example, the various methods described above may omit some acts, include other acts, or execute acts in a different order than set out in the illustrated embodiments.

The present methods, systems and articles also may be implemented as a computer program product that comprises a computer program mechanism embedded in a computer readable storage medium. For instance, the computer program product could contain program modules for installing and operating the applications described above. These program modules may be stored on CD-ROM, DVD, magnetic disk storage product, flash media or any other computer readable data or program storage product. The software modules in the computer program product may also be distributed electronically, via the Internet or otherwise, by transmission of a data signal (in which the software modules are embedded) such as embodied in a carrier wave.

For instance, the foregoing detailed description has set forth various embodiments of the devices and applications via the use of examples. Insofar as such examples contain one or more functions or operations, it will be understood by those skilled in the art that each function or operation within such examples can be implemented, individually and/or collectively, by a wide range of hardware, software, firmware, or virtually any combination thereof. In one embodiment, the present subject matter may be implemented via Application-Specific Integrated Circuits (ASICs). However, those skilled in the art will recognize that the embodiments disclosed herein, in whole or in part, can be equivalently implemented in standard integrated circuits, as one or more computer programs running on one or more computers, as one or more programs running on one or more controllers (e.g., microcontrollers) as one or more programs running on one or more processors (e.g., microprocessors), as firmware, or as virtually any combination thereof, and that designing the circuitry or writing the code for the software and or firmware would be well within the skill of one of ordinary skill in the art in light of this disclosure.

In addition, those skilled in the art will appreciate that the applications taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, flash drives and computer memory; and transmission type media such as digital and analog communication links using TDM or IP based communication links (e.g., packet links).

Further, in the methods taught herein, the various acts may be performed in a different order than that illustrated and described. Additionally, the methods can omit some acts, and/or employ additional acts.

For the sake of convenience, the embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A system for operating a complex system, the system comprising:
  (a) a processor; and
  (b) a memory having recorded thereon statements and instructions for execution by the processor to implement:
    (i) a monitor object communicatively coupled with a physical machine that comprises part of the complex system, the monitor object configured to monitor information generated by the physical machine during operation of the complex system;
    (ii) an element library comprising a base element expressed according to an element taxonomy;
    (iii) an event mapping agent communicatively coupled between the monitor object and the element library and configured to normalize the information by mapping the information to the base element, wherein the information inherits characteristics of the base element during normalization;
    (iv) an information database communicatively coupled to the event mapping agent to store the normalized information;
    (v) a universal translator communicatively coupled between the monitor object and the element library, the universal translator translating the information such that it is expressed according to the element taxonomy;
    (vi) an event tagging agent communicatively coupled between the universal translator and the physical machine, the event tagging agent configured to tag the information such that it can be mapped to the element taxonomy associated with the base element;
    (vii) a simulation machine communicatively coupled to the information database and configured to simulate operation of the complex system, wherein the simulation machine is configured to simulate the effect of an assertion on the complex system, wherein the assertion comprises a hypothesis regarding how the complex system operates;
    (viii) a simulation event information store communicatively coupled to the simulation machine and configured to store the simulation events;
    (ix) a knowledge database; and
    (x) a learning machine communicatively coupled to the information database and to the knowledge database, wherein the learning machine is configured to determine whether the assertion is valid by monitoring results of the effect of the assertion and, if the assertion is valid, to store the assertion in the knowledge database.

2. A system as claimed in claim 1 wherein the element library further comprises information recorded from one or more reference complex systems.

3. A system as claimed in claim 1 further comprising an automation system communicatively coupled to the complex system and configured to map an automation preference to a physical automation item used to automate the complex system, wherein the automation preference is normalized to the base element and inherits automation information from the base element used to operate the physical automation item.

4. A system as claimed in claim 3 wherein the automation information comprises automation drawings and an automation bill of materials, and wherein the automation configuration engine uses the automation information to build an automation system configured to operate the complex system.

5. A system as claimed in claim 3 further comprising an automation configuration engine communicatively coupled to the complex system and a knowledge database containing a valid assertion describing how the complex system operates communicatively coupled to the automation configuration engine, and wherein the automation configuration engine modifies configuration of the complex system in response to changes in the knowledge database.

6. A method for constructing or configuring a complex system, the method comprising:
  (a) normalizing a design criterion to a complex system base element expressed according to an element taxonomy to create a normalized design criterion, wherein the design criterion inherits a characteristic of the base element during normalization;
  (b) mapping the normalized design criterion to a physical item;
  (c) constructing or configuring the complex system by incorporating the physical item into the complex system, wherein the element taxonomy comprises separate asset and work elements, wherein the asset element describes an asset used to provide a service and the work element describes how the asset is used to provide the service;
  (d) monitoring information generated during operation of the complex system;
  (e) normalizing the information to the complex system base element, wherein the information inherits a characteristic of the base element during normalization;
  (f) storing the normalized information in an information database; and
  (g) generating knowledge related to operation of the complex system by:
    (i) simulating the effect of an assertion on the complex system using a simulation space comprising a virtual model of the complex system, wherein the assertion comprises a hypothesis regarding how the complex system operates; and
    (ii) if the assertion is valid, storing the assertion in a knowledge database.

7. A method as claimed in claim 6 wherein the complex system is an automation system used to automate another complex system.

8. A method as claimed in claim 6 further comprising associating the information with metadata describing the information, wherein associating the information with metadata comprises tagging the information such that it can be mapped to the element taxonomy.

9. A method as claimed in claim 8 wherein the base element is drawn from an element library comprising information recorded from one or more reference complex systems.

10. A method as claimed in claim 8 further comprising automating the complex system by mapping an automation preference to a physical automation item used to automate the complex system, wherein the automation preference is normalized to the base element and inherits automation information from the base element used to operate the physical automation item.

11. A method as claimed in claim 10 wherein the automation information comprises automation drawings and an automation bill of materials, and further comprising using the automation information to build an automation system configured to operate the complex system.

12. A method as claimed in claim 8 further comprising utilizing the knowledge to increase performance of the complex system when the complex system is automated.

13. A non-transitory computer readable medium having encoded thereon statements and instructions for execution by a processor to cause the processor to perform a method comprising:
 (a) normalizing a design criterion to a complex system base element expressed according to an element taxonomy to create a normalized design criterion, wherein the design criterion inherits a characteristic of the base element during normalization;
 (b) mapping the normalized design criterion to a physical item;
 (c) constructing or configuring the complex system by incorporating the physical item into the complex system, wherein the element taxonomy comprises separate asset and work elements, wherein the asset element describes an asset used to provide a service and the work element describes how the asset is used to provide the service;
 (d) monitoring information generated during operation of the complex system;
 (e) normalizing the information to the complex system base element, wherein the information inherits a characteristic of the base element during normalization;
 (f) storing the normalized information in an information database; and
 (g) generating knowledge related to operation of the complex system by:
  (i) simulating the effect of an assertion on the complex system using a simulation space comprising a virtual model of the complex system, wherein the assertion comprises a hypothesis regarding how the complex system operates; and
  (ii) if the assertion is valid, storing the assertion in a knowledge database.

14. A system for constructing or configuring a complex system, the system comprising:
 (a) a processor; and
 (b) a computer readable medium communicatively coupled to the processor, the computer readable medium having encoded thereon statements and instructions to cause the processor to execute a method comprising:
  (i) normalizing a design criterion to a complex system base element expressed according to an element taxonomy to create a normalized design criterion, wherein the design criterion inherits a characteristic of the base element during normalization;
  (ii) mapping the normalized design criterion to a physical item;
  (iii) constructing or configuring the complex system by incorporating the physical item into the complex system, wherein the element taxonomy comprises separate asset and work elements, wherein the asset element describes an asset used to provide a service and the work element describes how the asset is used to provide the service;
  (iv) monitoring information generated during operation of the complex system;
  (v) normalizing the information to the complex system base element, wherein the information inherits a characteristic of the base element during normalization;
  (vi) storing the normalized information in an information database; and
  (vii) generating knowledge related to operation of the complex system by:
   (1) simulating the effect of an assertion on the complex system using a simulation space comprising a virtual model of the complex system, wherein the assertion comprises a hypothesis regarding how the complex system operates; and
   (2) if the assertion is valid, storing the assertion in a knowledge database.

\* \* \* \* \*

UNITED STATES PATENT AND TRADEMARK OFFICE
CERTIFICATE OF CORRECTION

| | | |
|---|---|---|
| PATENT NO. | : 8,595,258 B2 | Page 1 of 1 |
| APPLICATION NO. | : 12/996575 | |
| DATED | : November 26, 2013 | |
| INVENTOR(S) | : Mark Gordon Damm | |

It is certified that error appears in the above-identified patent and that said Letters Patent is hereby corrected as shown below:

On the Title Page:

Item (87), line 1
Change "WO2010/135829" to -- WO2010/135839 --

Signed and Sealed this
Eleventh Day of February, 2014

Michelle K. Lee
*Deputy Director of the United States Patent and Trademark Office*